June 9, 1925.  1,541,555
S. M. FAIRCHILD ET AL
MAKING PHOTOGRAPHS FOR MAPPING AND OTHER PURPOSES
Filed July 15, 1921
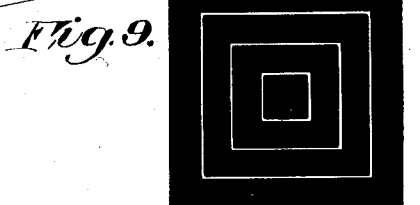
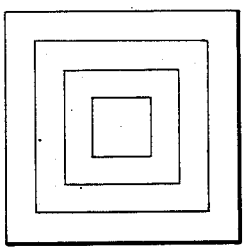 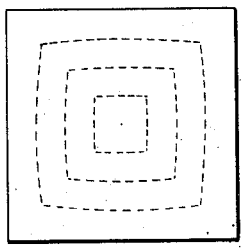 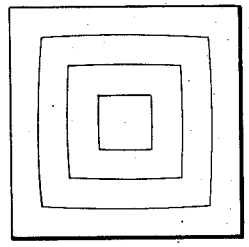
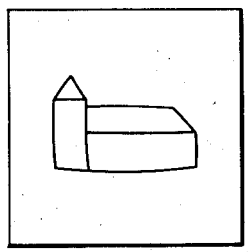
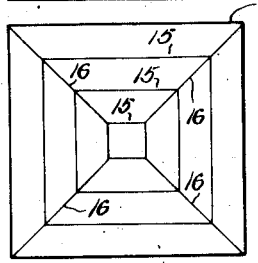
S. M. Fairchild
H. E. Ives
Inventor
By his Attorneys
Kerr, Page, Cooper & Hayward Patented June 9, 1925.

1,541,555

UNITED STATES PATENT OFFICE.

SHERMAN M. FAIRCHILD, OF ONEONTA, NEW YORK, AND HERBERT E. IVES, OF MONTCLAIR, NEW JERSEY, ASSIGNORS TO FAIRCHILD AERIAL CAMERA CORPORATION, OF NEW YORK, N. Y., A CORPORATION OF NEW YORK.

MAKING PHOTOGRAPHS FOR MAPPING AND OTHER PURPOSES.

Application filed July 15, 1921. Serial No. 484,872.

*To all whom it may concern:*

Be it known that we, SHERMAN M. FAIRCHILD and HERBERT E. IVES, both citizens of the United States of America, residing at Oneonta, county of Otsego, and State of New York, and Montclair, county of Essex, and State of New Jersey, respectively, have invented certain new and useful Improvements in Making Photographs for Mapping and Other Purposes, of which the following is a full, clear, and exact description.

In making drawings to scale from photographs, for example maps from photographs taken at an elevation above the ground, as from an airplane, it is highly desirable that the lenses used in making the photographs shall be perfectly rectilinear, but as a matter of fact many lenses otherwise well corrected cause marked distortion on the photograph, with the results that measurements made on the plate or print are not strictly proportional to the corresponding distances on the ground or other object photographed. In addition to the distortion introduced by the lens, there may be others caused by the interposition of refracting media for the purpose of altering the quality of the light, or to act as a supporting surface for the sensitive film. Moreover, in photographing on celluloid films, it is found that the film shrinks in the course of developing, fixing and drying, thus distorting the image. The distortion thus introduced is serious in large films such as are used in aerial mapping; and in addition the shrinkage of the film is so irregular, and is so affected by the age of the film, temperature of development, etc., that it is practically impossible to make allowance for shrinkage in subsequent use of the photographs. It is accordingly the chief object of our present invention to provide a simple and effective method of making photographs so that film negative or prints therefrom, even when the negative is made with a non-rectilinear lens, or through a glass filter or supporting plate, can be used for the purpose indicated without material sacrifice of accuracy in the drawing, or can be used as photographic maps without rectification. To this and other ends the invention consists in the novel procedure hereinafter described.

The preferred way of practising the invention is illustrated diagrammatically in the accompanying drawing, in which—

Fig. 1 illustrates, with some exaggeration, the course of the rays through a non-rectilinear lens, and through an interposed glass plate 11, in contact with the film 13.

Fig. 2 shows a "pattern" of straight lines, and represents also a photograph of the same as taken with a perfectly rectilinear or non-distorting lens upon a sensitive surface not subject to distortional shrinkage, and with no refracting medium other than air between the lens and the sensitive surface.

Fig. 3 indicates the same pattern as it appears distorted by the lens, or by the lens and a glass filter or supporting plate, in the image projected upon the plane surface of a plate or film in the focal plane of the lens.

Fig. 4 represents a convenient form of network or pattern on the pressure plate used in our present method.

Fig. 5 represents the photograph of an object taken with a distorting lens, or with a lens and interposed glass plate.

Fig. 6 represents a photograph (positive) of the same object taken with the same lens but with the network or reference pattern of Fig. 4 on the plate or film during exposure.

Fig. 7 represents a rectified drawing of the image and reference pattern of Fig. 6.

Fig. 8 illustrates a wire frame which may be used in contact with the plate or film to produce the desired network or reference pattern.

Fig. 9 represents a pattern of straight lines, in white on a black ground, which may be photographed to produce a negative (showing black lines on a transparent ground) adapted for use as a pressure plate in our method.

Referring to Fig. 1, the line 10 represents an object which is to be photographed upon a plate or film 13 through a lens 12, and a glass supporting plate or filter 11. If the lens is truly rectilinear, the emergent rays corresponding to the marginal incident rays *a, b*, will be in effect prolongations of the former as indicated by the broken lines *a', b'*, or at any rate will be parallel thereto, but if the lens suffers from distortion the actual paths of the emergent rays referred to will not be prolongations of or parallel to the corresponding incident rays but will lie outside or inside, as indicated by the unbroken lines c, d.

If with such a lens a photograph is made of a pattern or network of straight lines, as for example the concentric rectangles or squares shown in Fig. 2, the corresponding lines in the photograph will be bowed or curved in toward the center (so-called "pillow-shaped" distortion) or will be bowed or curved outwardly toward the edge of the plate (so-called "barrel-shaped" distortion) as in Fig. 3. A building photographed with such a lens may appear as shown (perhaps with some exaggeration) in Fig. 5.

In addition to the distortion just described, if the rays must also traverse the glass plate 11, before reaching the sensitive surface, additional barrel distortion is produced. In order to obviate the difficulty presented by these distortions we impress upon the plate or film at the time of exposure a network or reference pattern which is distorted in correspondence with the image of the object photographed. For this purpose we prepare a reference pattern, preferably composed of straight lines, as for example the concentric squares on a plane surface shown in Fig. 2, and of this we make a negative with the same lens that we intend to use subsequently in photographing for maps or other purposes. The image of the pattern, Fig. 2, then appears on the plate in somewhat the form of Fig. 3, if the lens gives barrel-shape distortion. From the negative thus produced we prepare a transparent pressure plate having on one surface in more or less opaque lines the corresponding pattern, as in Fig. 4. This pressure plate may be made in various ways. For example it may be the original glass negative of the pattern with sharp black lines on a transparent ground produced by photographing a pattern consisting of white lines on a black ground, such as shown, for example, in Fig. 9, or by "reversing" the negative made from a pattern composed of black lines on a white ground, such as shown, for example, in Fig. 2, or the lines may be etched in glass and the resulting lines filled with pigment, or it may be made by printing (on a sensitized plate) by the gelatin-bichromate method. In any case the "base" on which the lines appear should be transparent and the lines should be sharp and should have exactly the same distortion as produced by the lens. Preferably the base is a thin glass plate.

In using the plate, it is placed in front of the sensitive film or plate on which the object or the ground is to be photographed, with the lined surface pressed in close contact with the emulsion of the film or dryplate which emulsion is of course turned toward the lens. In practice this plate would be identical with the filter or film support required for other purposes. The exposure is then made, and in doing so the lines of the distorted reference pattern are impressed upon the emulsion as shadows, so that in the resulting negative they will appear as more or less transparent lines on the darker parts of the image. The result is something like that indicated in Fig. 6, the distorted image of the building being overlaid with the correspondingly distorted reference pattern. A rectified drawing can then be made by drawing on a surface containing an undistorted pattern, as in Fig. 7, keeping the lines of the object in the same relation to the undistorted pattern as the distorted lines of the object in the photograph have to the distorted pattern.

In preparing the pattern plate, we prefer to photograph the original (undistorted) pattern upon a glass plate or other rigid surface instead of on a celluloid film, for the reason that celluloid, as stated above, does not shrink evenly in development and fixation, and hence it is difficult if not impossible to make allowance for the shrinkage.

If the negatives are to be made on films, with a lens which is strictly rectilinear, or sufficiently so for practical purposes, and some other means of holding the film flat is used in place of a supporting plate, as for instance suction, the only distortion that will be encountered is shrinkage-distortion, that is, distortion due to shrinkage of the film in subsequent treatment thereof (developing, fixing and drying) to make the negatives. A lens-distorted pattern is therefore unnecessary, and accordingly the reference pattern may be composed of straight lines and may be made as a wire frame. Such a frame is shown diagrammatically in Fig. 8 and comprises an outer frame 14 and inner squares 15 of wire, connected and supported by diagonal wires 16. The frame bearing the pattern is used in the manner already described. The lines of the pattern will then be impressed (without distortion) on the negative film but their image will be distorted in common with the image of the ground or other object when the film is developed, fixed and dried.

It is to be understood that the invention is not limited to the features herein specifically described but can be practised in other ways without departure from its spirit.

We claim:

1. In the art of making photographic negatives on films or other sensitive surfaces, for mapping or other purposes, the improvement comprising projecting upon the plate or film the image which is to be recorded, through a reference pattern composed of lines, whereby an image of the reference pattern and the image of the ground or other object to be photographed are both recorded on the same film and are subjected to the same distortion due to shrinkage of the film in subsequent treatment thereof to produce a negative.

2. The herein described method of nullifying the effects of shrinkage-distortion in photographs made on films for mapping or other purposes, comprising arranging directly in front of the surface of the film a reference pattern composed of lines, and projecting an image of the ground or other object through said reference pattern to the plate or film, whereby said reference pattern and said image are simultaneously recorded on the film and are subjected to the same distortion in subsequent treatment of the film.

3. The herein described method of nullifying the effects of shrinkage-distortion and lens-distortion in photographs made on films or other sensitive surfaces for mapping or other purposes through a lens or optical system which is not strictly rectilinear, comprising photographing through the lens or optical system a line-pattern to produce a distorted photograph of the pattern, preparing therefrom on a transparent base a reference pattern composed of lines having corresponding distortion, arranging the reference pattern in contact with the sensitive film, and projecting thereon through said reference pattern and with the same lens an image of the ground or other object, whereby the latter image, and an image of the correspondingly distorted lines of the reference pattern, are simultaneously recorded on the film, and are subjected to equal distortion by the shrinkage of the film in subsequent treatment thereof.

4. The herein described method of nullifying the effects of shrinkage-distortion and lens-distortion in photographs made for mapping or other purposes through an optical system which is not strictly rectilinear, comprising preparing a rectilinear line-pattern composed of concentric rectangles, photographing the same on a glass plate through the distortion lens, etching on a glass plate a line-pattern having the same distortion as in the photograph to form a reference pattern; and in subsequent photographing with said lens, making the exposures through the etched glass plate arranged with its reference pattern in the focal plane of the lens; whereby the resulting photographs bear images of the distorted reference pattern.

5. The herein described method of nullifying the effects of shrinkage-distortion and lens-distortion in photographs made for mapping or other purposes through a lens or optical system which is not strictly rectilinear, comprising impressing on the plate or film at the time of exposure a reference pattern composed of lines distorted in correspondence with the distortion of the image of the ground or other object photographed.

In testimony whereof we hereto affix our signatures.

SHERMAN M. FAIRCHILD.
HERBERT E. IVES.